United States Patent
Kristensson et al.

(10) Patent No.: US 8,956,442 B2
(45) Date of Patent: Feb. 17, 2015

(54) DEVICES AND METHODS FOR IMPROVEMENT OF MICROVASCULAR FUNCTION

(75) Inventors: Dan Allan Robert Kristensson, Ängelholm (SE); Jan Åke Allen Kristensson, Ängelholm (SE); Pål Martin Svensson, Halmstad (SE)

(73) Assignee: Airsonett AB, Angelholm (SE)

( * ) Notice: Subject to any disclaimer, the term of this patent is extended or adjusted under 35 U.S.C. 154(b) by 1074 days.

(21) Appl. No.: 12/416,253

(22) Filed: Apr. 1, 2009

(65) Prior Publication Data
US 2009/0247065 A1 Oct. 1, 2009

Related U.S. Application Data

(60) Provisional application No. 61/041,252, filed on Apr. 1, 2008.

(51) Int. Cl.
*B01D 50/00* (2006.01)
*F24F 3/16* (2006.01)
*G06Q 30/02* (2012.01)

(52) U.S. Cl.
CPC .......... *F24F 3/1607* (2013.01); *G06Q 30/0241* (2013.01)
USPC ................ 95/273; 55/385.2; 55/416; 55/467; 55/467.1

(58) Field of Classification Search
USPC .................. 55/385.1, 385.2, 416, 467, 467.1; 454/187; 95/273; 128/205.27
See application file for complete search history.

(56) References Cited

U.S. PATENT DOCUMENTS

| | | | |
|---|---|---|---|
| 5,129,928 A | * | 7/1992 | Chan et al. ...................... 95/273 |
| 6,702,662 B2 | * | 3/2004 | Kristensson .................. 454/187 |
| 6,811,593 B2 | | 11/2004 | Hansson et al. |
| 7,037,188 B2 | | 5/2006 | Schmid et al. |

OTHER PUBLICATIONS

Pope CA, Dockery DW. *Health effects of fine particulate air pollution: lines that connect*. J Air Waste Manag Assoc 2006;56:709-742.
Miller KA, Siscovick DS, Sheppard L, Shepherd K, Sullivan JH, Anderson GL, Kaufman JD. *Long-term exposure to air pollution and incidence of cardiovascular events in women*. N Engl J Med 2007;356:447-458.
Schlesinger RB, Kunzli N, Hidy GM, Gotschi T, Jerrett M. *The health relevance of ambient particulate matter characteristics: coherence of toxicological and epidemiological inferences*. Inhal Toxicol 2006;18: 95-125.
Donaldson K, Mills N, MacNee W, Robinson S, Newby D. *Role of inflammation in cardiopulmonary health effects of PM*. Toxicol Appl Pharmacol 2005; 207:483-488.

(Continued)

*Primary Examiner* — Robert A Hopkins
(74) *Attorney, Agent, or Firm* — Marvin Petry; Stites & Harbison PLLC

(57) ABSTRACT

Provided are methods and devices for improving microvascular function in humans and mammals. Reduction of exposure to airborne fine particles using air treatment systems increases microvascular function in persons at cardiovascular risk. Preferred treatment systems provide a zone of clean air having >75% reduction in airborne particle counts around a person at cardiovascular risk. The devices and methods can be optimally used during sleep, when the user is stationary for an extended period.

6 Claims, 1 Drawing Sheet

(56) References Cited

OTHER PUBLICATIONS

Mills NL, Amin N, Robinson SD, Anand A, Davies J, Patel D, de la Fuente JM, Cassee FR, Boon NA, MacNee W, et al. *Do inhaled carbon nanoparticles translocate directly into the circulation in humans?* Am J Respir Crit Care Med 2006;173:426-431.

Peters A, von Klot S, Heier M, Trentinaglia I, Hörmann A, Wichmann HE, Löwel H; Cooperative Health Research in the Region of Augsburg Study Group. *Exposure to traffic and the onset of myocardial infarction.* N Engl J Med 2004;351:1721-1730.

Laden F, Neas LM, Dockery DW, Schwartz J. *Association of fine particulate matter from different sources with daily mortality in six US cities.* Environ Health Perspect 2000;108:941-947.

Hoek G, Brunekreef B, Goldbohm S, Fischer P, van den Brandt PA. *Association between mortality and indicators of traffic-related air pollution in The Netherlands: a cohort study.* Lancet 2002;360:1203-1209.

Lerman A, Zeiher AM. *Endothelial function: cardiac events.* Circulation 2005;111:363-368.

Heitzer T, Schlinzig T, Krohn K, Meinertz T, Munzel T. *Endothelial dysfunction, oxidative stress, and risk of cardiovascular events in patients with coronary artery disease.* Circulation 2001;104:2673-2678.

Newby DE, Wright RA, Labinjoh C, Ludlam CA, Fox KA, Boon NA, Webb DJ. *Endothelial dysfunction, impaired endogenous fibrinolysis, and cigarette smoking: a mechanism for arterial thrombosis and myocardial infarction.* Circulation 1999;99:1411-1415.

Newby DE, McLeod AL, Uren NG, Flint L, Ludlam CA, Webb DJ, Fox KA, Boon NA. *Impaired Coronary tissue plasminogen activator release is associated with coronary atherosclerosis and cigarette smoking: direct link between endothelial dysfunction and atherothrombosis.* Circulation 2001;103:1936-1941.

Kaul, D. K. et al., *Arginine therapy of transgenic-knockout sickle mice improves microvascular function by reducing non-nitric oxide vasodilators, hemolysis, and oxidative stress*, American Journal of Physiology-Heart and Circulatory Physiology, 295 (1): H39-H47, Jul. 2008.

Oflaz, H. et al., *Coronary flow reserve is impaired in patients with adult growth hormone (GH) deficiency*, Clinical Endocrinology, 66 (4): 524-529, Apr. 2007.

Topcu, S. et al., *Metformin therapy improves microvascular function in patients with polycystic ovary syndrome and insulin resistance*, Clinical Endocrinology, 65 (1): 75-80, Jul. 2006.

Tomas, J. P. et al., *Effect of candesartan on coronary flow reserve in patients with systemic hypertension*, Journal of Hypertension, 24 (10): 2109-2114, Oct. 2006.

Gooding, K. M. et al., *Impact of hormone replacement therapy on microvascular function in healthy and Type 2 diabetic postmenopausal women*, Diabetic Medicine, 22 (5): 536-542, May 2005.

Schachinger, V. and Zeiher, A. M., *Coronary microcirculation. Pathophysiology, clinical relevance, and importance for regenerative therapy*, Herz, 30 (7): 641-650, Nov. 2005. Abstract Provided.

Fegan, P. G. et al., *Microvascular endothelial function in subjects with Type 2 diabetes and the effect of lipid-lowering therapy*, Diabetic Medicine, 22 (12): 1670-1676, Dec. 2005.

Brener, S. J. And Topol, E. J., *Adjunctive therapy for percutaneous revascularization in acute myocardial infarction*, Current Pharmaceutical design, 10 (4): 399-405, 2004.

Tomas, J. P. et al., *Noninvasive assessment of the effect of atorvastatin on coronary microvasculature and endothelial function in patients with dyslipidemia*, Revista Española de Cardiología, 57 (10): 909-915, Oct. 2004.

Abrahamson, M. J., *Clinical use of thiazolidinediones: Recommendations*, American Journal of Medicine, 115: 116-120 Suppl. 8A, Dec. 8, 2003.

*Portable room air cleaners*, Consumer Reports, Feb. 2002; 41 and 46.

*Whole-house air cleaners*, Consumer Reports, Feb. 2002; 41 and 48.

Vaclavik, E, et al., *Indoor particles affect vascular function in the aged*, Am. J. Respir. Crit. Care (2008), 177:419-425, Feb. 15, 2008.

Kuvin JT, Karas RH. *Clinical utility of endothelial function testing: ready for prime time?* Circulation 2003;107:3243-3247.

Kuvin JT, Patel AR, Sliney KA, Pandian NG, Sheffy J, Schnall RP, Karas RH, Udelson JE. *Assessment of peripheral vascular endothelial function with finger arterial pulse wave amplitude.* Am Heart J 2003;146:168-174.

Bonetti PO, Barsness GW, Keelan PC, Schnell TI, Pumper GM, Kuvin JT, Schnall RP, Holmes DR, Higano ST, Lerman A. *Enhanced external counterpulsation improves endothelial function in patients with symptomatic coronary artery disease.* J Am Coll Cardiol 2003;41: 1761-1768.

Dockery DW, et al., *An association between air pollution and mortality in six U.S. cities*.N Engl J Med. 1993; 329(24):1753-9.

Schneider A, et al., *Endothelial dysfunction: associations with exposure to ambient fine particles in diabetic individuals.* Environ Health Perspect. 2008;116(12):1666-74.

\* cited by examiner

DEVICES AND METHODS FOR IMPROVEMENT OF MICROVASCULAR FUNCTION

This application claims the benefit of U.S. 61/041,252 filed Apr. 1, 2008.

FIELD OF THE INVENTION

The invention relates to methods and devices for improved microvascular function in humans and mammals by reduction of exposure to airborne fine particles.

BACKGROUND

It has long been recognized that exposure to airborne particles is associated with increased morbidity and mortality in respiratory and cardiovascular health. See ref. 1 and 2. Particulate irritants are believed to induce pulmonary inflammation, cardiac autonomic function, endothelial dysfunction, systemic inflammation, oxidative stress, and altered balance between blood clotting and fibrinolysis. Larger particles have been considered to present less risk of irritation per unit mass due to higher surface area to volume ratios. See ref. 3-5. Airborne particulate matter associated with automobile exhaust has been indicated as particularly pernicious. See ref. 6-8.

Endothelial dysfunction (EdF) has been recognized as a strong predictor of adverse cardiovascular outcomes and is by now widely recognized as being, itself, a mechanism of increased cardiovascular risk. See ref. 9-12. Measurements of coronary microvascular function, which can be obtained non-invasively, provide a functional measure that relates to underlying endothelial function. Improvement of microvascular function is often reported as the goal and primary study endpoint for a variety of pharmaceutical intervention schemes. See e.g. ref 13-22.

Here we report that microvascular function can be improved in humans at cardiovascular risk by interventions directed at reducing exposure to airborne fine particles.

BRIEF DESCRIPTION OF THE DRAWINGS

FIG. 1 shows a schematic illustration of one embodiment of a device according to the invention.

DETAILED DESCRIPTION OF PREFERRED EMBODIMENTS

1. Persons in need of Improvements in Microvascular Function

Endothelial dysfunction (EdF) is recognized as an independent predictor of cardiovascular risk. Coronary microvascular function provides a measure of coronary endothelial function. Persons at cardiovascular risk, in general, can benefit from improvements of microvascular function. These include at least aged persons, (for example, >60 years), overweight persons, persons with family history of heart disease, smokers, excessive drinkers, persons suffering from atherosclerosis, hypertension, renal insufficiency, diabetes, HIV infection, or elevated cholesterol levels.

2. Methods of Improving Microvascular Function

In some embodiments, indoor air is filtered and re-circulated in the living and/or working space of a person in need of improvement of microvascular function. Air treatment can be continuous, for extended periods, or discontinuous, for treatment intervals. In preferred embodiments, a user is treated with air treatment for at least 48 hours continuously, in which airborne particle counts are reduced at least 60%. In more preferred embodiments, a user is treated with ongoing, discontinuous, air treatment, where living quarters are maintained by air treatment with airborne particle counts reduced at least 60% relative to untreated air, with users free to enter and exit the clean air environment, for a period of at least 6 months.

In preferred embodiments, which may be used in the alternative or in addition to re-circulation of filtered indoor air, an air treatment device that defines a zone of clean air is positioned around a person in need of improvement in microvascular function.

A device is preferably positioned so as to provide a zone of clean air during periods of sleep. In preferred embodiments, a user is treated with exposure to a zone of clean air, during periods of sleep, in which airborne particle counts are reduced by at least 75% compared with ambient air. In preferred embodiments, a user is treated with exposure to a zone of clean air in which airborne particle counts are reduced by at least 75%, during periods of sleep, for at least 6 hours daily for an extended period of at least 6 months.

3. Devices for Improving Microvascular Function

Microvascular function may be informally referred to as improvements of cardiovascular health. Microvascular function can be measured by endothelium dependent vasodilation, coronary flow reserve or other methods well known in the art.

Some embodiments of a device according to the invention are air treatment devices comprising at least one high efficiency particulate air (HEPA) filter, adapted to provide reduction of airborne fine particles in re-circulated indoor air, and used as an intervention to improve microvascular function.

Some embodiments provide a specific zone of clean air around a patient and/or person at cardiovascular risk, preferably during periods of sleep.

Any suitable air treatment device, or "air purifier," may be used to practice methods of the invention. For example any of the devices comprising at least one HEPA filter are suitable that are described in ref. 23-24, which are hereby incorporated by reference in entirety.

For embodiments that provide purification of re-circulated indoor air, a suitable device comprises an air filter and a fan. A conventional re-circulating air purifier is using the principle of diluting ventilation. The filtrated air is blown into the premises with a high impulse by means of the fan. The high impulse is actuate the ambient air into motion and mixes with the filtrated air. In a perfect mixing system the level of pollutants have same concentration in all parts of the premises. The mixed air is re-circulated into the air purifier and the filtrated air dilutes the pollutants in the room. The concentration of pollutants in the room is proportional to the airflow, room size and mixing efficiency.

Preferred embodiments that provide a specific zone of clean air around a patient and/or person at cardiovascular risk during periods of sleep utilize laminar flow of purified air, preferably temperature-controlled laminar airflow (TLA), as described in U.S. Pat. No. 6,702,662, which is hereby incorporated by reference in entirety. Typically, a flow of purified air is directed from above, downwardly over a person, or laterally, across a person. In TLA, filtered air is cooled to a lower temperature than the air in the desired protected area such that the clean air which will provide a clean-air zone is at a lower temperature, ideally 0.3-3° C. cooler, than the ambient air surrounding the protected zone. The cooled, clean air is driven by a minimal impulse, sufficient only to overcome resistance in the filter and air supply system, through a nozzle that provides laminar flow. The cooled, clean, laminar air flow sinks slowly downwards towards the protected area. The higher density of the cooled air limits its downward velocity. TLA is advantageous, not only because it avoids turbulent in-mixing of ambient air into a clean air zone, which is associated with forced-blowing of purified air, but also because it avoids unnecessary drafts across the skin surface of the person within the clean air zone.

In a TLA system, as described in U.S. Pat. No. 6,702,662, the pollutant concentration within the clean air zone is determined by the filter efficiency and is independent of the room size. The size of the clean air zone is determined by the airflow, distance from and shape of the air delivery device. The clean air zone needs to cover breathing zone of the user, i.e. the head area of the patient or person at cardiovascular risk. The zone of clean air provided by such devices may provide >95% reduction of airborne fine particle counts, and typically provide at least >75% reduction.

In other embodiments, a device may provide a zone of clean air using conventional filtration systems. For example, any of the devices are suitable which are described in U.S. Pat. No. 7,037,188 or U.S. Pat. No. 6,811,593, which are hereby incorporated by reference in entirety. Alternatively, commercially available devices such as the Airsonett PROTEXO™ or the Airex M100 ™ or EIU™ may be used.

Conventional systems providing zones of clean air make use of the impulse from the air outlet. To be able to provide a highly purified zone of clean air, i.e., without in-mixing of ambient air into the clean air zone, the system needs a shroud separating the clean air from ambient air. For convenience the shroud (tent) needs to cover the whole body of a patient and thereby the airflow also needs to cover the whole body of the patient. The airflow in a conventional system needs to be much greater than in a TLA system.

Some embodiments may provide, both, purification of re-circulated indoor air and, also, a specific zone of clean air around a patient and/or person at cardiovascular risk during periods of sleep. The air treatment device can simultaneously provide a zone of clean air and, also, feed clean air to the remaining portions of the premises, as described in U.S. Pat. No. 6,702,662. The air treatment device can also be modified so as to have alternative orientations of an air delivery nozzle which, during non-sleep hours, provide general re-circulation of purified air while, during sleep hours, provide a defined zone of clean air around a sleeping person.

4. Methods of Doing Business

In some embodiments, the invention provides methods of doing business. In reference to one or more air treatment devices, a claim, statement or direction can be included in manuals, advertisements, package inserts, and/or applications to FDA, MEDICARE or other agencies, that microvascular function, or similar parameters related to endothelial function, can be improved in a human by reducing exposure to airborne fine particles using general indoor air filtration or devices that provide a specific zone of clean air.

Example 1

Improvement of Microvascular Function in an Elderly Population at Risk

The following are reproduced from ref. 25, which is hereby incorporated by reference in entirety.

Twenty one (21) non-smoking couples, aged 60-75 (median, 67), mean body mass index 25 (SD, 3.24) participated in a randomized, double-blind, crossover study in their homes with two consecutive 48-hour exposures to either particle-filtered (2,533-4,058 particles/cm$^3$) or non-filtered air (7,718-12,988 particles/cm$^3$) the study. All participants were healthy non-smokers and each served as his/her own control. For the duration of the study, participants remained indoors 92-94% of the time, with windows closed.

The project was a double-blind intervention with randomized order of 48-hour exposure to recirculated particle-filtered and non-filtered indoor air in the participants' homes in Copenhagen, Denmark, in close proximity to major roads. Two filter units (Airshower, Airsonett AB, Angelholm, Sweden) were placed in the bedroom and living room of each apartment, and run continuously with airflow of 540 m$^3$/hour, sound level beneath 35 dB. Filter exhaust columns of height 2.15 m were placed in the bedroom and living room and bedroom of each apartment during the study period, either with or without (control) a HEPA filter. The placebo unit without HEPA filter had filtration efficiency beneath 10%, with unchanged noise, airflow and appearance. Air pollution monitoring equipment was placed at the furthest point diagonally away from the filter.

The size distribution and number concentration (NC) of particles (within the size range 10-700 nm) was monitored continuously in each residence. Dichotomous stacked filter units (University of Hertforshire, Hatfield, UK) were used to collect particles in two size ranges—fine (<2.5 uM diameter, hereafter PM2.5) and coarse (10-2.5 uM diameter, hereafter PM10-2.5). Particle mass was determined gravimetrically.

Microvascular function was measured non-invasively, immediately before blood sampling using reactive hyperemia-induced peripheral artery tonometry (RH-PAT) as described in ref. 26-28.

The technique uses finger-mountable pneumatic sensors (Endo-PAT 2000, Itamar Medical Ltd, Cesaria, Israel) specifically designed to continuously record the digital arterial pulse wave amplitude. Each probe consists of inflatable latex membranes surrounded by a rigid case, allowing the application of a uniform, near-diastolic, pressure field over the entire surface of the distal part of the finger including the fingertip. Probe pressure is generated by a computer-controlled mini-compressor housed within the control console, which also contains the necessary pressure transducers, signal filters and amplifiers, data storage, signal processing means, and a screen to display the signals. Data were digitally stored as pulse wave tracings from both hands and these tracings reviewed for off-line analysis using the display and measurement properties of associated software. A microvascular function (MVF) score describing the extent of hyperemia was computed using the average amplitude of the PAT signal during the 1 minute period beginning 90 seconds after cuff deflation divided by the average amplitude of the PAT signal during a 3 minute period prior to the cuff inflation. To eliminate potential confounding of systemic effects of unilateral arm ischemia, this ratio was normalised to the concurrent signal from the control arm. The resulting value was further corrected for baseline signal amplitude.

Consistent with the general expectation that aging is associated with improved cardiovascular risk, young, healthy volunteers breathing non-filtered air were shown to have improved MVF scores (2.14; 95% CI, 2.08-2.19) relatively to elderly volunteers (aged 60-75, median 67; 1.78; 95% CI, 1.68 to 1.89).

Blood and urine samples were taken on the morning after each 48-hour treatment period, at the same time of morning. Table I summarizes the indoor levels of particulate matter and NO$_2$ during the two different exposure scenarios.

TABLE I

Indoor air characteristics

| Variable | Non-filtered air Geomtetric mean (95% CI) | Filtered air Geometric mean (95% CI) |
|---|---|---|
| NC10-700 nm, no./cm$^3$ | 10,016 (7,718-12,998) | 3,206 (2,533-4,058) |
| Area 10-700 nm, um$^2$/cm$^3$ | 173 (144-209) | 47 (38-58) |
| Volume 10-700 nm, um$^3$/cm$^3$ | 5.7 (4.7-6.8) | 1.6 (1.3-2.0) |
| PM10-2.5, ug/m$^3$ | 9.4 (8.1-11.0) | 4.6 (3.5-6.0) |
| PM2.5, ug/m$^3$ | 12.6 (11.2-14.1) | 4.7 (3.9-5.7) |
| NO$_2$, ppb | 20 (18-21) | 20 (18-22) |
| Relative humidity % | 34.0 (30.9-37.4) | 34.0 (31.1-37.1) |
| Temperature, ° C. | 21.6 (21.2-22.0) | 21.5 (21.1-21.9) |

The microvascular function score (MVF) was significantly improved by 8.1% (95% CI, 0.4-16.3%; p=0.03) after 48 hours air filtration.

These effects were observed after only a single 48-hour intervention. Further improvements might occur after prolonged intervention of 6 months to 1 year.

Example 2

Improvement of Microvascular Function using an Air Treatment Device that provides a Specific Zone of Clean Air An air treatment device that provides a zone of clean air, such as that shown in FIG. 1, can be positioned above the sleeping space of a person at cardiovascular risk. The device shown is the Airsonett PROTEXO™. In this device, ambient air is taken in at lower levels of a premises, filtered through a HEPA filter, then cooled to a temperature slightly lower, typically from 0.3-3° C. lower, than room temperature. Cooled, filtered air is then ejected through a nozzle that provides laminar flow. TLA of the cooled, pure air defines a zone of clean air with minimal ambient in-mixing and avoiding unpleasant drafts across the face of the user or person at cardiovascular risk.

While the general recirculation approach described in example 1 provides about 60% reduction in particle counts, the device shown in FIG. 1 reduces particle exposure >95% within the clean air zone. There is a link between cardiovascular disease and the chronic immune response caused by particle exposure. See e.g. ref. 29-30. The much greater particle reduction within the zone of clean air provided by the TLA device may have a more significant effect on microvascular function. Use of a device that provides a zone of clean air is especially useful during night, or sleeping hours, during which the user is stationary for extended periods. Exposure to particles from both the ambient room air and particles generated from the bed environment are essentially eliminated.

The examples and embodiments disclosed are intended to be representative only and not to limit the invention as defined by the claims.

REFERENCES

1. Pope CA, Dockery DW. *Health effects of fine particulate air pollution: lines that connect*. J Air Waste Manag Assoc 2006;56:709-742.
2. Miller KA, Siscovick DS, Sheppard L, Shepherd K, Sullivan JH, Anderson GL, Kaufman JD. *Long-term exposure to air pollution and incidence of cardiovascular events in women*. N Engl J Med 2007;356:447-458.
3. Schlesinger RB, Kunzli N, Hidy GM, Gotschi T, Jerrett M. *The health relevance of ambient particulate matter characteristics: coherence of toxicological and epidemiological inferences*. Inhal Toxicol 2006;18: 95-125.
4. Donaldson K, Mills N, MacNee W, Robinson S, Newby D. *Role of inflammation in cardiopulmonary health effects of PM*. Toxicol Appl Pharmacol 2005; 207:483-488.
5. Mills NL, Amin N, Robinson SD, Anand A, Davies J, Patel D, de la Fuente JM, Cassee FR, Boon NA, MacNee W, et al. *Do inhaled carbon nanoparticles translocate directly into the circulation in humans?* Am J Respir Crit Care Med 2006;173:426-431.
6. Peters A, von Klot S, Heier M, Trentinaglia I, Hörmann A, Wichmann HE, Löwel H; Cooperative Health Research in the Region of Augsburg Study Group. *Exposure to traffic and the onset of myocardial infarction*. N Engl J Med 2004;351:1721-1730.
7. Laden F, Neas LM, Dockery DW, Schwartz J. *Association of fine particulate matter from different sources with daily mortality in six US cities*. Environ Health Perspect 2000; 108:941-947.
8. Hoek G, Brunekreef B, Goldbohm S, Fischer P, van den Brandt PA. *Association between mortality and indicators of traffic-related air pollution in The Netherlands: a cohort study*. Lancet 2002;360:1203-1209.
9. Lerman A, Zeiher AM. *Endothelial function: cardiac events*. Circulation 2005;111:363-368.
10. Heitzer T, Schlinzig T, Krohn K, Meinertz T, Munzel T. *Endothelial dysfunction, oxidative stress, and risk of cardiovascular events in patients with coronary artery disease*. Circulation 2001;104:2673-2678.
11. Newby DE, Wright RA, Labinjoh C, Ludlam CA, Fox KA, Boon NA, Webb DJ. *Endothelial dysfunction, impaired endogenous fibrinolysis, and cigarette smoking: a mechanism for arterial thrombosis and myocardial infarction*. Circulation 1999;99:1411-1415.
12. Newby DE, McLeod AL, Uren NG, Flint L, Ludlam CA, Webb DJ, Fox KA, Boon NA. *Impaired Coronary tissue plasminogen activator release is associated with coronary atherosclerosis and cigarette smoking: direct link between endothelial dysfunction and atherothrombosis*. Circulation 2001;103:1936-1941.
13. Kaul, D. K. et al., *Arginine therapy of transgenic-knockout sickle mice improves microvascular function by reducing non-nitric oxide vasodilators, hemolysis, and oxidative stress*, American Journal of Physiology-Heart and Circulatory Physiology, 295 (1): H39-H47, July 2008.
14. Oflaz, H. et al., *Coronary flow reserve is impaired in patients with adult growth hormone (GH) deficiency*, Clinical Endocrinology, 66 (4): 524-529, April. 2007.
15. Topcu, S. et al., *Metformin therapy improves microvascular function in patients with polycystic ovary syndrome and insulin resistance*, Clinical Endocrinology, 65 (1): 75-80, July 2006.
16. Tomas, J. P. et al., *Effect of candesartan on coronary flow reserve in patients with systemic hypertension*, Journal of Hypertension, 24 (10): 2109-2114, October 2006.
17. Gooding, K. M. et al., *Impact of hormone replacement therapy on microvascular function in healthy and Type 2 diabetic postmenopausal women*, Diabetic Medicine, 22 (5): 536-542, May 2005.
18. Schachinger, V. and Zeiher, A. M., *Coronary microcirculation. Pathophysiology, clinical relevance, and importance for regenerative therapy*, Herz, 30 (7): 641-650, November 2005.

19. Fegan, P. G. et al., *Microvascular endothelial function in subjects with Type 2 diabetes and the effect of lipid-lowering therapy*, Diabetic Medicine, 22 (12): 1670-1676, December 2005.
20. Brener, S. J. and Topol, E. J., *Adjunctive therapy for percutaneous revascularization in acute myocardial infarction*, Current Pharmaceutical design, 10 (4): 399-405, 2004.
21. Tomas, J. P. et al., *Noninvasive assessment of the effect of atorvastatin on coronary microvasculature and endothelial function in patients with dyslipidemia*, Revista Espanola de Cardiologia, 57 (10): 909-915, October 2004.
22. Abrahamson, M. J., *Clinical use of thiazolidinediones: Recommendations*, American Journal of Medicine, 115: 116-120 Suppl. 8A, Dec. 8, 2003.
23. *Portable room air cleaners*, Consumer Reports, February 2002; 46-47
24. *Whole-house air cleaners*, Consumer Reports, February 2002; 48-49.
25. Vaclavik, E, et al., *Indoor particles affect vascular function in the aged*, Am. J. Respir. Crit. Care (2008), 177:419, Feb. 15, 2008.
26. Kuvin JT, Karas RH. *Clinical utility of endothelial function testing: ready for prime time?* Circulation 2003;107: 3243-3247.
27. Kuvin JT, Patel AR, Sliney KA, Pandian NG, Sheffy J, Schnall RP, Karas RH, Udelson JE. *Assessment of peripheral vascular endothelial function with finger arterial pulse wave amplitude*. Am Heart J 2003;146:168-174.
28. Bonetti PO, Barsness GW, Keelan PC, Schnell TI, Pumper GM, Kuvin JT, Schnall RP, Holmes DR, Higano ST, Lerman A. *Enhanced external counterpulsation improves endothelial function in patients with symptomatic coronary artery disease*. J Am Coll Cardiol 2003;41: 1761-1768.
29. Dockery DW, et al., *An association between air pollution and mortality in six U.S. cities*.N Engl J Med. 1993; 329 (24):1753-9.
30. Schneider A, et al., *Endothelial dysfunction: associations with exposure to ambient fine particles in diabetic individuals*. Environ Health Perspect. 2008;116(12):1666-74.

The invention claimed is:

1. A method of treating a user comprising the steps of:
   increasing the user's microvascular function by at least 5% after 48 hours by;
   applying the method to a non-smoking human during periods of sleep,
   reducing the user's inhaled exposure to airborne fine particles by generating a clean air zone around the user by indoor air filtration, which results in a reduction in the airborne fine particle count of more than 95% as measured in the clean air zone when compared to ambient air, and
   causing air in the clean air zone to descend at a velocity resulting from maintaining the air temperature of the air deployed into the clean air zone at a temperature range of between 0.3 to 3.0 degrees C. cooler than the ambient air surrounding the clean air zone,
   such that the descending air descends in a laminar fashion which substantially prevents in-mixing of ambient air, which prevents the user from being exposed to an unpleasant draft and substantially prevents airborne particles from the ambient air to increase the airborne particle count of the air in the clean air zone.

2. A method according to claim 1, wherein the user is a person at cardiovascular risk.

3. A method according to claim 1, wherein the clean air zone is limited to the head area of the user.

4. A method according to claim 1, including applying the method for at least 6 hours daily and for an extended period of at least 6 months.

5. A method according to claim 1, including driving the cool clean air by a minimal impulse sufficient only to overcome resistance in relation to discharge of clean air.

6. A method according to claim 1, including driving the cooled clean air by a minimal impulse sufficient only to overcome resistance in relation to discharge of clean air.

\* \* \* \* \*